United States Patent [19]
Robbins et al.

[11] Patent Number: 5,699,544
[45] Date of Patent: Dec. 16, 1997

[54] METHOD AND APPARATUS FOR USING A FIXED WIDTH WORD FOR ADDRESSING VARIABLE WIDTH DATA

[75] Inventors: William Philip Robbins, Cam; Adrian Philip Wise, Bristol, both of United Kingdom

[73] Assignee: Discovision Associates, Irvine, Calif.

[21] Appl. No.: 474,220

[22] Filed: Jun. 7, 1995

Related U.S. Application Data

[62] Division of Ser. No. 399,800, Mar. 7, 1995, and Ser. No. 400,397, Mar. 7, 1995, which is a continuation-in-part of Ser. No. 382,958, Feb. 2, 1995, which is a continuation of Ser. No. 82,291, Jun. 24, 1993, abandoned.

[30] Foreign Application Priority Data

| Mar. 24, 1994 | [GB] | United Kingdom | 9405914 |
| Jul. 29, 1994 | [GB] | United Kingdom | 9415387 |
| Feb. 28, 1995 | [GB] | United Kingdom | 9503964 |

[51] Int. Cl.$^6$ .................................................. G06F 12/04
[52] U.S. Cl. ............................... 395/421.02; 395/421.1
[58] Field of Search ........................ 395/421.02, 421.1; 341/67; 364/254.9, 255

[56] References Cited

U.S. PATENT DOCUMENTS

| 3,893,042 | 7/1975 | Whitman et al. | 331/55 |
| 3,962,685 | 6/1976 | Belle Isle | 395/597 |
| 4,142,205 | 2/1979 | Iinuma | 348/394 |
| 4,149,242 | 4/1979 | Pirz | 395/405 |
| 4,196,448 | 4/1980 | Whitehouse et al. | 348/400 |
| 4,215,369 | 7/1980 | Iijima | 348/387 |

(List continued on next page.)

FOREIGN PATENT DOCUMENTS

| 0196911 | 8/1986 | European Pat. Off. |
| 0255767 | 10/1988 | European Pat. Off. |
| 0589734 | 3/1994 | European Pat. Off. |
| 0639032 | 2/1995 | European Pat. Off. |
| 2059724 | 4/1981 | United Kingdom |
| 2171578 | 8/1986 | United Kingdom |
| 2194085 | 2/1988 | United Kingdom |
| 2268035 | 12/1993 | United Kingdom |

OTHER PUBLICATIONS

Chong, "A Data Flow Architecture For Digital Image Processing," WesconTech. Papers No. 4/6, Oct. 30, 1984, Anaheim, California, USA, pp. 1–10.

P. Yip, et al., "DIT and DIF Algorithm for Discrete Sine and Cosine Transforms" Proceedings of the International Symposium on Circuits and Systems, IEEE Press, New York, US, vol. 2/3, 5 Jun. 1985, Kyoto, JP, pp. 941–944.

Hsieh S. Hou, "A Fast Recursive Algorithm for Computing the Discrete Cosine Transform," IEEE Transactions on Acoustics, Speech, and Signal Processing, vol. 35, No. 10, Oct. 1987, IEEE Press, New York, US, pp. 1455–1461.

Komori et al., "An Elastic Pipeline Mechanism By Self–Timed Circuits", IEEE Journal of Solid–State Circuits, vol. 23, No. 1, Feb. 1988, New York, NY, USA, pp. 111–117.

A. Gupta et al., "A Fast Recursive Algorithm for the Discrete Sine Transform," IEEE Transactions on Acoustics, Speech, and Signal Processing, vol. 38, No. 3, Mar. 1990, IEEE Press, New York, US, pp. 553–557.

H.R. Wu, et al., "A Two Dimensional Fast Cosine Transform Algorithm Based on Hou's Approach," IEEE Transaction on Acoustics, Speech, and Signal Processing, vol. 39, No. 2, Feb. 1991, IEEE Press, New York, US, pp. 544–546.

*Primary Examiner*—Matthew M. Kim
*Assistant Examiner*—Hoai Ho
*Attorney, Agent, or Firm*—Ronald J. Clark; Robert T. Braun; Arthur S. Bickel

[57] ABSTRACT

A method for addressing memory uses a word with a fixed width, having a fixed number of bits, and having a width defining field and address field. The procedure is adapted to addressing variable width data. In one embodiment memory can be addressed using a fixed width word having a fixed number of bits, and having both a substitution field and an address field.

6 Claims, 3 Drawing Sheets

| FIXED WIDTH WORD FOR ADDRESSING ||||||
|---|---|---|---|---|---|
| WIDTH DEFINING FIELD || ADDRESS FIELD ||| SUBSTITUTION INDICATOR |
| ^ || | SUBSTITUTION FIELD || |
| CONTINUATION MARKERS | TERMINATION MARKER | | TERMINATION MARKER | CONTINUATION MARKERS | |
| uu.........uu | vv.........vv | aa.........aa | yy.........yy | xx.........xx | ww.....ww |
| 000 | 1 | 1101 | 1 | 000 | 0 |
| 111 | 0 | 1101 | 0 | 111 | 1 |

U.S. PATENT DOCUMENTS

| | | | |
|---|---|---|---|
| 4,251,864 | 2/1981 | Kindell et al. | 395/411 |
| 4,334,246 | 6/1982 | Saran | 358/261.1 |
| 4,433,308 | 2/1984 | Hirata | 331/17 |
| 4,437,072 | 3/1984 | Asami | 331/1 A |
| 4,467,443 | 8/1984 | Shima | 395/416 |
| 4,495,629 | 1/1985 | Zasio et al. | 377/70 |
| 4,507,731 | 3/1985 | Morrison | 395/411 |
| 4,540,903 | 9/1985 | Cooke et al. | 327/211 |
| 4,580,066 | 4/1986 | Berndt | 327/197 |
| 4,593,267 | 6/1986 | Kuroda et al. | 341/67 |
| 4,617,657 | 10/1986 | Drynan et al. | 370/394 |
| 4,679,163 | 7/1987 | Arnould et al. | 364/725 |
| 4,726,019 | 2/1988 | Adelmann et al. | 370/474 |
| 4,785,349 | 11/1988 | Keith et al. | 348/390 |
| 4,789,927 | 12/1988 | Hannah | 395/800 |
| 4,799,677 | 1/1989 | Frederiksen | 463/43 |
| 4,829,465 | 5/1989 | Knauer et al. | 364/725 |
| 4,831,440 | 5/1989 | Borgers et al. | 348/403 |
| 4,866,510 | 9/1989 | Goodfellow et al. | 348/394 |
| 4,894,823 | 1/1990 | Adelmann et al. | 370/252 |
| 4,912,668 | 3/1990 | Aubie et al. | 364/725 |
| 4,922,341 | 5/1990 | Strobach | 358/136 |
| 4,924,298 | 5/1990 | Kitamura | 358/12 |
| 4,924,308 | 5/1990 | Feuchtwanger | 358/133 |
| 4,975,595 | 12/1990 | Roberts et al. | 307/272.2 |
| 5,003,204 | 3/1991 | Cushing et al. | 307/465 |
| 5,036,475 | 7/1991 | Ueda | 395/510 |
| 5,053,985 | 10/1991 | Friedlander et al. | 364/725 |
| 5,057,793 | 10/1991 | Cowley et al. | 331/1 A |
| 5,060,242 | 10/1991 | Arbeiter | 375/122 |
| 5,081,450 | 1/1992 | Lucas et al. | 340/728 |
| 5,086,489 | 2/1992 | Shimura | 382/56 |
| 5,107,345 | 4/1992 | Lee | 358/432 |
| 5,111,292 | 5/1992 | Kuriacose et al. | 348/384 |
| 5,113,255 | 5/1992 | Nagata et al. | 348/416 |
| 5,122,873 | 6/1992 | Golin | 348/390 |
| 5,122,875 | 6/1992 | Raychaudhuri et al. | 348/390 |
| 5,124,790 | 6/1992 | Nakayama | 348/384 |
| 5,126,842 | 6/1992 | Andrews et al. | 348/384 |
| 5,130,568 | 7/1992 | Miller et al. | 327/202 |
| 5,134,487 | 7/1992 | Taguchi et al. | 348/384 |
| 5,136,371 | 8/1992 | Savatier et al. | 348/419 |
| 5,142,380 | 8/1992 | Sakagami et al. | 358/432 |
| 5,146,325 | 9/1992 | Ng | 348/384 |
| 5,146,326 | 9/1992 | Hasegawa | 348/390 |
| 5,148,271 | 9/1992 | Kato et al. | 348/390 |
| 5,151,875 | 9/1992 | Sato | 364/784 |
| 5,159,449 | 10/1992 | Allmendinger | 348/390 |
| 5,164,819 | 11/1992 | Music | 348/420 |
| 5,168,356 | 12/1992 | Acampora et al. | 348/409 |
| 5,168,375 | 12/1992 | Reisch et al. | 358/432 |
| 5,172,011 | 12/1992 | Leuthold et al. | 327/202 |
| 5,175,617 | 12/1992 | Wallace et al. | 348/384 |
| 5,185,819 | 2/1993 | Ng et al. | 382/234 |
| 5,189,526 | 2/1993 | Sasson | 358/432 |
| 5,191,548 | 3/1993 | Balkanski et al. | 364/725 |
| 5,193,002 | 3/1993 | Guichard et al. | 348/415 |
| 5,200,925 | 4/1993 | Morooka | 365/219 |
| 5,201,056 | 4/1993 | Daniel et al. | 395/800 |
| 5,202,847 | 4/1993 | Bolton et al. | 364/725 |
| 5,212,549 | 5/1993 | Ng et al. | 348/409 |
| 5,212,742 | 5/1993 | Normile et al. | 382/166 |
| 5,214,507 | 5/1993 | Aravind et al. | 348/390 |
| 5,216,724 | 6/1993 | Suzuki et al. | 382/135 |
| 5,223,926 | 6/1993 | Stone et al. | 348/396 |
| 5,227,863 | 7/1993 | Bilbrey et al. | 348/578 |
| 5,227,878 | 7/1993 | Puri et al. | 348/416 |
| 5,228,098 | 7/1993 | Crinon et al. | 382/240 |
| 5,231,484 | 7/1993 | Gonzales et al. | 348/405 |
| 5,231,486 | 7/1993 | Acampora et al. | 348/390 |
| 5,233,420 | 8/1993 | Piri et al. | 348/513 |
| 5,237,413 | 8/1993 | Israelsen et al. | 348/700 |
| 5,241,383 | 8/1993 | Chen et al. | 348/405 |
| 5,241,658 | 8/1993 | Masterson et al. | 395/509 |
| 5,249,146 | 9/1993 | Uramoto et al. | 364/725 |
| 5,253,058 | 10/1993 | Gharavi | 348/415 |
| 5,253,078 | 10/1993 | Balkanski et al. | 358/426 |
| 5,257,213 | 10/1993 | Kim et al. | 364/725 |
| 5,257,223 | 10/1993 | Dervisoglu | 365/154 |
| 5,258,725 | 11/1993 | Kinoshita | 331/17 |
| 5,260,781 | 11/1993 | Soloff et al. | 348/396 |
| 5,260,782 | 11/1993 | Hui | 348/409 |
| 5,261,064 | 11/1993 | Wyland | 395/421.01 |
| 5,276,513 | 1/1994 | van der Wal et al. | 348/416 |
| 5,276,784 | 1/1994 | Ohki | 395/127 |
| 5,276,832 | 1/1994 | Holman, Jr. | 395/402 |
| 5,278,520 | 1/1994 | Parker et al. | 331/1 A |
| 5,278,646 | 1/1994 | Civanlar et al. | 348/384 |
| 5,278,647 | 1/1994 | Hingorani et al. | 348/415 |
| 5,283,646 | 2/1994 | Bruder | 348/415 |
| 5,287,178 | 2/1994 | Acampora et al. | 348/384 |
| 5,287,420 | 2/1994 | Barrett | 382/233 |
| 5,289,276 | 2/1994 | Siracusa et al. | 348/469 |
| 5,293,229 | 3/1994 | Iu | 348/415 |
| 5,294,894 | 3/1994 | Gebara | 331/1 A |
| 5,298,896 | 3/1994 | Lei et al. | 341/51 |
| 5,298,992 | 3/1994 | Pietras et al. | 348/415 |
| 5,299,025 | 3/1994 | Shirasawa | 358/400 |
| 5,300,949 | 4/1994 | Rodriguez et al. | 345/202 |
| 5,301,019 | 4/1994 | Citta | 348/416 |
| 5,301,032 | 4/1994 | Hong et al. | 358/261.2 |
| 5,301,040 | 4/1994 | Hoshi et al. | 358/465 |
| 5,301,136 | 4/1994 | McMillan, Jr. et al. | 364/725 |
| 5,301,272 | 4/1994 | Atkins | 395/501 |
| 5,304,953 | 4/1994 | Heim et al. | 331/1 A |
| 5,305,438 | 4/1994 | MacKay et al. | 395/511 |
| 5,309,527 | 5/1994 | Ohki | 382/250 |
| 5,351,047 | 9/1994 | Behlen | 341/67 |
| 5,404,474 | 4/1995 | Crook et al. | 395/421.02 |
| 5,481,689 | 1/1996 | Stamm et al. | 395/563 |
| 5,509,129 | 4/1996 | Guttag et al. | 395/379 |
| 5,553,258 | 9/1996 | Godiwala et al. | 395/403 |

| FIXED WIDTH WORD FOR ADDRESSING | |
|---|---|
| WIDTH DEFINING FIELD | ADDRESS FIELD |
| CONTINUATION MARKERS | TERMINATION MARKER | |
| uu............uu | vv............vv | aa.....aa |

FIG.6

| FIXED WIDTH WORD FOR ADDRESSING | | |
|---|---|---|
| ADDRESS FIELD | | SUBSTITUTION INDICATOR |
| | SUBSTITUTION FIELD | |
| | TERMINATION MARKER | CONTINUATION MARKERS | |
| aa............aa | yy............yy | xx............xx | ww.....ww |

FIG.7

| FIXED WIDTH WORD FOR ADDRESSING | | | | |
|---|---|---|---|---|
| WIDTH DEFINING FIELD | | ADDRESS FIELD | | SUBSTITUTION INDICATOR |
| | | | SUBSTITUTION FIELD | |
| CONTINUATION MARKERS | TERMINATION MARKER | | TERMINATION MARKER | CONTINUATION MARKERS | |
| uu............uu | vv............vv | aa............aa | yy............yy | xx............xx | ww.....ww |
| 000 | 1 | 1101 | 1 | 000 | 0 |
| 111 | 0 | 1101 | 0 | 111 | 1 |

FIG.8

| FIXED WIDTH WORD WITH VARIABLE FIELDS | | |
|---|---|---|
| FIRST FIELD | SECOND FIELD | |
| | TERMINATION MARKER | CONTINUATION MARKERS |
| aa............aa | yy............yy | xx.....xx |

FIG.9

METHOD AND APPARATUS FOR USING A FIXED WIDTH WORD FOR ADDRESSING VARIABLE WIDTH DATA

This application is a division of application Ser. No. 08/399,800 filed Mar. 7, 1995, and a division of application Ser. No. 08/400,397, filed Mar. 7, 1995, which is a continuation-in-part of U.S. application Ser. No. 08/382,958 filed Feb. 2, 1995, which is a continuation of U.S. application Ser. No. 08/082,291 filed Jun. 24, 1993, now abandoned.

FIELD OF THE INVENTION

This invention relates generally to a method and apparatus for addressing memory and, in particular, to using a fixed width word having a fixed number of bits to be used for addressing variable width data and address substitution.

SUMMARY OF THE INVENTION

A procedure for addressing memory having the following steps is disclosed: providing a fixed width word having a predetermined fixed number of bits to be used for addressing variable width data, defining the fixed width word with a width defining field and an address field providing the width defining field with at least one bit to serve as the termination marker, defining the address field with a plurality of bits defining the address of the data, varying the size of bits in the address field in inverse relation to the size of the variable width data, varying the number of bits in the width defining field in direct relation to the size of the variable width data and maintaining a fixed width word for addressing variable width data while varying the width of the width defining field and the address field. In addition, a procedure for addressing memory having the following steps is disclosed: providing a fixed width word having a predetermined fixed number of bits to be used for addressing data, defining the fixed width word with an address field and a substitution field, defining the address field with a plurality of bits defining the address of the data, defining a variable width substitution field with a least one substitution bit, the substitution field has at least one bit to serve as a termination marker between the address field and the substitution field, using the substitution field to indicate substituted bits from a separate addressing source and maintaining a fixed width word for addressing variable width data while inversely varying the width of the address field and the width of the substitution field. In addition, a process for addressing variable width data in a memory having the following steps providing a memory having words of predetermined width and composed of partial words rotating the partial word to be accessed to a least significant bit justification, extending remaining part of the word so that the accessed word will be recognized as the partial word, restoring the remaining part of the word and rotating the word until the partial word is restored to its original position.

BRIEF DESCRIPTION OF THE DRAWINGS

FIG. 6 is a fixed width word to be used for addressing, having a width defining field and an address field.

FIG. 7 is a fixed width word to be used for addressing, having an address field, a substitution field and a substitution indicator.

FIG. 8 is an example of a 13 bit word to be used to address 8 bit data in a 64×32 RAM.

FIG. 9 is an example of a fixed width word having fields.

DETAILED DESCRIPTION OF THE INVENTION FOR MEMORY ADDRESSING

Figure 1:
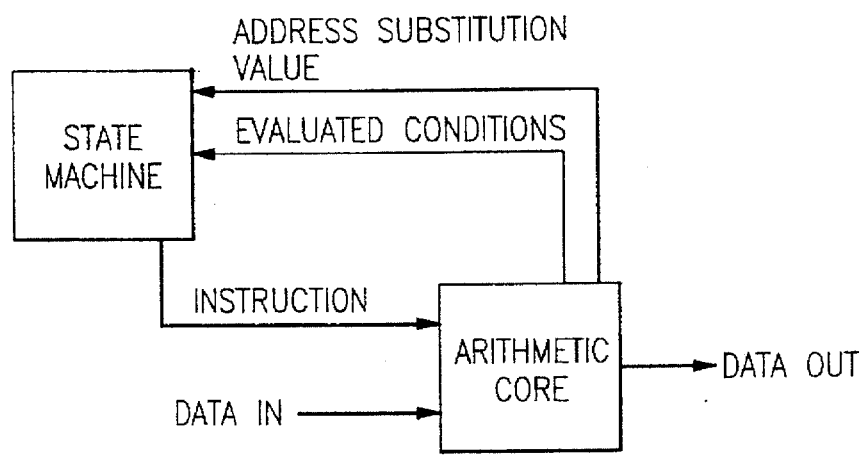
FIG. 1 is a block diagram of the Microcodable state machine.

A method and apparatus for addressing memory is described herein. In particular, the process calls for using a fixed width word for addressing variable width data. In various forms of the embodiment, the fixed width word may contain a width defining field, an address field, and/or a substitution field. The length of the fixed width word is predetermined by the amount of memory to be addressed. The apparatus form of the present invention includes a microcodable state machine with an arithmetic core.

The microcodable state machine is intended to be used to solve design problems where there is a need for versatile and/or complicated calculations. Examples of such designs are: address generation, stream parsing and decoding or filter tap coefficient calculations. The addressing must cope with two different features, variable length addresses to access varying width portions of words and address substitution. In the present invention, a RAM having a 64×32 bit configuration can be addressed in partial words having 64×32 bit, 128×16 bit, 256×8 bit, 512×4 bit, 1024×2 bit or 2048×1 bit formats.

VARIABLE LENGTH FIELDS WITHIN A FIXED WIDTH WORD

In many applications it is useful to define variable portions of a word (to be known as fields) for actions such as substitution, variable width data addressing, or the constriction of other parts of the word. The conventional method for this would be to have an additional word (or words) to specify the width of the field (or fields) within the word. Below a method for encoding this information within the word itself will be described. This method has the advantages of saving bits in the overall definition of the word, simplifying decoding of the encoded word and providing a more intuitive view of what has been encoded. This encoding method is applicable if the variable width fields are most or least significant bit justified within the word.

Table 1-1 shows two examples of variable width fields (marked "F") least significant bit justified defined within an eight bit word, "w" marks other potential fields of these words.

TABLE 1-1

| Bit number (hex) | 7 | 6 | 5 | 4 | 3 | 2 | 1 | 0 |
|---|---|---|---|---|---|---|---|---|
| Fixed word | w | w | w | F | F | F | F | F |
|  | w | w | w | w | w | w | F | F |

Table 1-2 shows the conventional method of encoding the fields shown in Table 1-1 by the addition of enough bits to specify the maximum width of the field in binary. (Bits marked "x" are "don't care"—a term of art). Too much space is taken up with this method.

TABLE 1-2

| Bit number (hex) | 7 | 6 | 5 | 4 | 3 | 2 | 1 | 0 | Field Define | | |
|---|---|---|---|---|---|---|---|---|---|---|---|
| Fixed word | w | w | w | x | x | x | x | x | 1 | 0 | 1 |
|  | w | w | w | w | w | w | x | x | 0 | 1 | 0 |

Table 1-3 shows the encoding of the fields shown in Table 1-1 using the new method. This method defines the field by using a continuation marker and a termination marker. In this case the continuation marker is "1" and the termination marker is "0". The field is defined as all continuation markers from the justified end of the field (least significant in this case) until and including the termination marker. It is shown in Table 1-3 that to encode the field, the space taken by a termination marker must be added to the fixed width word at the start of the field, this allows the definition of a zero length field by the additional space containing a termination marker.

TABLE 1-3

| Bit number (hex) | 7 | 6 | 5 | 4 | 3 | 2 | 1 | 0 |
|---|---|---|---|---|---|---|---|---|
| Fixed word | w | w | w | 0 | 1 | 1 | 1 | 1 |
| Continuation marker = 1; Termination marker = 0. | w | w | w | w | w | w | 0 | 1 | 1 |

It can be seen that the advantages of this encoding method are:

1. A reduction in the number of bits needed in the encoding.
2. A simplification in the decoding required since the need for a "x to 1 of 2ˣ" decode of the "field define" shown in Table 1-2 that would normally be needed is inherent in the encoding which is already in the form of 1 of 2ˣ.
3. The encoding is in a more intuitive form allowing the field defined to be easily identified.

The use of this encoding can be widened by stating that the termination marker and the continuation marker can be reversed to make the encoding of Table 1-3 resemble that of Table 1-4. In addition, the use of "1" or "0" is used interchangeably throughout this application.

TABLE 1-4

| Bit number (hex) | 7 | 6 | 5 | 4 | 3 | 2 | 1 | 0 |
|---|---|---|---|---|---|---|---|---|
| Fixed word | w | w | w | 1 | 0 | 0 | 0 | 0 |
| Continuation marker = 1; Termination marker = 0. | w | w | w | w | w | w | 1 | 0 | 0 |

Fields may also be most significant bit justified such as shown in Table 1-5. These are encoded in a similar way to least significant bit justified fields simply that the field reaches from the most significant bit (hereinafter "MSB") towards the least significant bit (hereinafter "LSB") up to and including the first termination marker. The encoding of the fields shown in Table 1-5 are shown in Table 1-6.

TABLE 1-5

| Bit number (hex) | 7 | 6 | 5 | 4 | 3 | 2 | 1 | 0 |
|---|---|---|---|---|---|---|---|---|
| Fixed word | F | F | F | F | F | w | w | w |
|  | F | F | w | w | w | w | w | w |

TABLE 1-6

| Bit number (hex) | 7 | 6 | 5 | 4 | 3 | 2 | 1 | 0 |
|---|---|---|---|---|---|---|---|---|
| Fixed word | 1 | 1 | 1 | 1 | 0 | w | w | w |
| Continuation marker = 1; Termination marker = 0. | 1 | 1 | 0 | w | w | w | w | w |

Finally, fields may be encoded from the least significant and most significant ends of the word simultaneously. For example, the two fields shown in Table 1-7 may be encoded as in Table 1-8, with the addition of just one bit for each field for the reason explained earlier.

TABLE 1-7

| Bit number (hex) | 7 | 6 | 5 | 4 | 3 | 2 | 1 | 0 |
|---|---|---|---|---|---|---|---|---|
| Fixed word | F | F | F | F | w | w | F | F |
|  | w | w | w | w | F | F | F | F |

TABLE 1-8

| Bit number (hex) | 7 | 6 | 5 | 4 | 3 | 2 | 1 | 0 |
|---|---|---|---|---|---|---|---|---|
| Fixed word | 1 | 1 | 1 | 0 | w | w | 0 | 1 | 1 |
| Continuation marker = 1; Termination marker = 0. | 0 | w | w | w | w | 0 | 1 | 1 | 1 |

In FIG. 9 the general above concept is illustrated. An address field, not necessarily used to address data has a field having a termination marker and a continuation marker. In this case the field is least significant bit justified.

USING FIXED WIDTH WORD WITH VARIABLE LENGTH FIELDS TO PERFORM ADDRESS SUBSTITUTION

There are situations in which it is useful to substitute part of a memory address by another value. In this way it is possible to construct a data dependent address. The following encoding method can be applied to the addresses of a memory to specify what portion of the address is to be substituted: providing a signal representing a fixed width word having a predetermined fixed number of bits to be used for addressing data; defining the fixed width word with an address field and a substitution field; defining the address field with a plurality of bits defining the address of the data; defining a variable width substitution field with a least one substitution bit, wherein the substitution field has at least one bit to serve as a termination marker between the address field and the substitution field; using the substitution field to indicate substituted bits from a separate addressing source; and maintaining a fixed width word for addressing variable width data while inversely varying the width of the address field and the width of the substitution field. If a least significant bit justified variable length field is used in this address, a substitution field can be defined. For example, a 12 bit address 0baaaaaaaaaaaa encoded to have its five least significant bit substituted by the 12 bit value 0bcccccccccccc would be 0baaaaaaa011111 and produce the address 0baaaaaaaccccc. Table 1-9 shows the encoding for substitution into a 12 bit address.

TABLE 1-9

Address substitution

| No. Bits Substituted | B | A | 9 | 8 | 7 | 6 | 5 | 4 | 3 | 2 | 1 | 0 |
|---|---|---|---|---|---|---|---|---|---|---|---|---|
| 0 | a | a | a | a | a | a | a | a | a | a | a | 0 |
| 1 | a | a | a | a | a | a | a | a | a | a | 0 | 1 |
| 2 | a | a | a | a | a | a | a | a | a | 0 | 1 | 1 |
| 3 | a | a | a | a | a | a | a | a | 0 | 1 | 1 | 1 |
| 4 | a | a | a | a | a | a | a | 0 | 1 | 1 | 1 | 1 |
| 5 | a | a | a | a | a | a | 0 | 1 | 1 | 1 | 1 | 1 |
| 6 | a | a | a | a | a | 0 | 1 | 1 | 1 | 1 | 1 | 1 |
| 7 | a | a | a | a | 0 | 1 | 1 | 1 | 1 | 1 | 1 | 1 |
| 8 | a | a | a | 0 | 1 | 1 | 1 | 1 | 1 | 1 | 1 | 1 |
| 9 | a | a | a | 0 | 1 | 1 | 1 | 1 | 1 | 1 | 1 | 1 |
| 10 | a | a | 0 | 1 | 1 | 1 | 1 | 1 | 1 | 1 | 1 | 1 |
| 11 | a | 0 | 1 | 1 | 1 | 1 | 1 | 1 | 1 | 1 | 1 | 1 |
| 12 | 0 | 1 | 1 | 1 | 1 | 1 | 1 | 1 | 1 | 1 | 1 | 1 |

In FIG. 7, a fixed width word for addressing having an address field with an optional substitution indicator. As mentioned above, the substitution field has a variable size and will function to substitute an outside addressing source for a variable amount of address bits "a". The substitution occurs in place of the termination marker bit(s) "y" and continuation marker bit(s) "x".

The termination marker functions to inform the address decoding circuit where the substitution stops. The continuation marker pads the fixed width word.

If substitution is always to be used, then there is no need for an indicator. However, a substitution indicator allows optimal use of substitution.

ADDRESSING VARIABLE WIDTH DATA WITH A FIXED WIDTH WORD.

One embodiment of the present invention is for addressing a memory which can be accessed at its full width or in $2^n$ widths up to its full width (these smaller words are called partial words). It will be shown how the variable field encoding can be used to address this memory and to index those addresses into the memory.

To access a 64×32 bit Register file in widths of 32, 16, 8, 4, 2, and 1 bit requires different lengths of address. There are twice as many 16 bit locations as 32 bit locations and thirty-two times more 1 bit locations than 32 bit locations. Additionally, up to eight bits of this address can be substituted by an index register. Thus, a variable amount of information must be coded into a fixed number of microcode bits. One method would be to have a three bit field for the width and for the number of LSB's to be substituted and 12 bits for the address, giving a microcode word of 18 bits. However, a better method is to use a most significant justified variable length field to constrict the address so that its width can be defined and, thus, the width of the access can be defined. For example, a six bit address indicates a 32 bit access while a 12 bit address indicates a 1 bit access. This is illustrated in Table 1-10 where continuation marker is "0"; termination marker is "1". It can be seen how the variable width field constricts the address "a ... a" so defining its width and so the access width. The general case of a fixed width word for addressing is shown in FIG. 6.

TABLE 1-10

Variable width addressing

| Data Width | A | 9 | 8 | 7 | 6 | 5 | 4 | 3 | 2 | 1 | 0 |
|---|---|---|---|---|---|---|---|---|---|---|---|
| 1 | 1 | a | a | a | a | a | a | a | a | a | a |
| 2 | 0 | 1 | a | a | a | a | a | a | a | a | a |
| 4 | 0 | 0 | 1 | a | a | a | a | a | a | a | a |
| 8 | 0 | 0 | 0 | 1 | a | a | a | a | a | a | a |
| 16 | 0 | 0 | 0 | 0 | 1 | a | a | a | a | a | a |
| 32 | 0 | 0 | 0 | 0 | 0 | 1 | a | a | a | a | a |

To allow indexing of address locations portions of the addresses "a ... a" can be substituted by an alternative value. The substitution portion (or field) of the address can be defined by a least significant bit justified variable length field (the continuation marker "1"; termination marker "0") that is super imposed on top of those shown in Table 1-10. Using an address of an eight bit word an example Table 1-11 shows how to define the number of the least significant bits to be substituted. The least significant bit added is the substitution indicator (marked "w"). The general case of a Fixed width word for substitution is shown in FIG. 8.

TABLE 1-11

Address substitution

| Bits to be substituted | A | 9 | 8 | 7 | 6 | 5 | 4 | 3 | 2 | 1 | 0 | w |
|---|---|---|---|---|---|---|---|---|---|---|---|---|
| 0 | 0 | 0 | 0 | 1 | a | a | a | a | a | a | a | 0 |
| 1 | 0 | 0 | 0 | 1 | a | a | a | a | a | a | 0 | 1 |
| 2 | 0 | 0 | 0 | 1 | a | a | a | a | a | 0 | 1 | 1 |
| 3 | 0 | 0 | 0 | 1 | a | a | a | a | 0 | 1 | 1 | 1 |
| 4 | 0 | 0 | 0 | 1 | a | a | a | 0 | 1 | 1 | 1 | 1 |
| 5 | 0 | 0 | 0 | 1 | a | a | 0 | 1 | 1 | 1 | 1 | 1 |
| 6 | 0 | 0 | 0 | 1 | a | 0 | 1 | 1 | 1 | 1 | 1 | 1 |
| 7 | 0 | 0 | 0 | 1 | 0 | 1 | 1 | 1 | 1 | 1 | 1 | 1 |
| 8 | 0 | 0 | 0 | 1 | 0 | 1 | 1 | 1 | 1 | 1 | 1 | 1 |

In effect, the substitute code is superimposed on top of the address that is already coded.

From this coding, it can be seen that there are illegal addresses, most obviously 0x0000 and 0x3fff, and in this case a "0" must be in the bottom 9 bits to prevent substituting more than 8 bits and a "1" in the top 6 bits to specify an allowable access width. If one of these errors is detected the access is undefined, but the Register file contents will not be affected.

The apparatus for addressing and a method for accessing partial words in a Register file will be discussed below.

Figure 3:
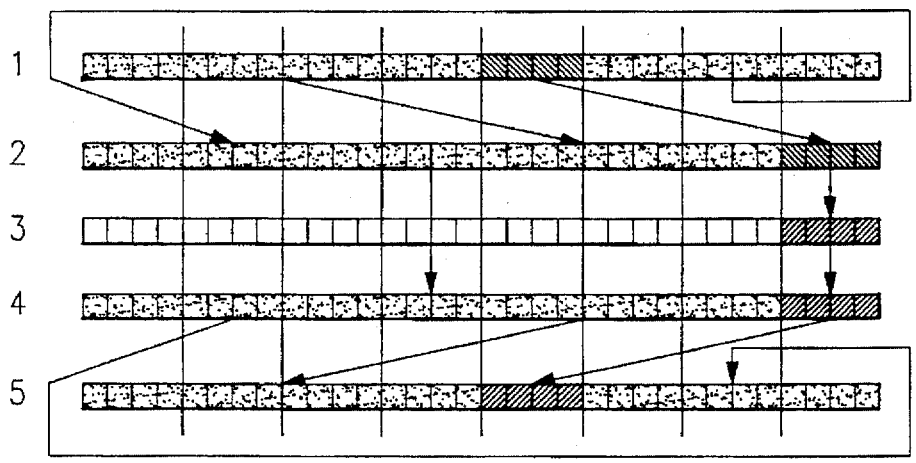
FIG. 3 is a functional diagram of the Register File.

The conventional memory circuitry dictates that the memory must always be accessed at its full width. To achieve variable width accesses, a full (32 bit) width word is read. This full word is rotated until the partial word accessed is justified in the LSB. The upper parts of the word are extended to the full width and then output. Extending may encompass padding with zeros or ones, sign extending, using the sign bit of a sign-magnitude number as the new MSB or any similar conventional method. Extending is dependent on the mode of operation. When the partial word is input to be written back into the memory it is multiplexed back into the rotated full word, which is then rotated back and written into the array. FIG. 3 shows these steps for the access of a 4 bit partial word in the fourth four bit word of the 32 bit word.

To access or read partial words, such as the highlighted four bit word in row "1" of FIG. 3, the full width word must be rotated to place the partial word at the LSB, as shown in row "2". As shown in row "3", the four bit word is extended to create a full 32 bit word. This word can now be accessed.

A full width word that has been selected to be written back is truncated to the width of the original partial word which is multiplexed into the word shown in row "2" at the LSB position, this is shown in row "4". The resulting word is rotated back in its original significance in the read word, this is shown in row "5". This full word can now be written back into the Register file.

The list below summarizes the steps numbered in the FIG. 3.

Figure 4:
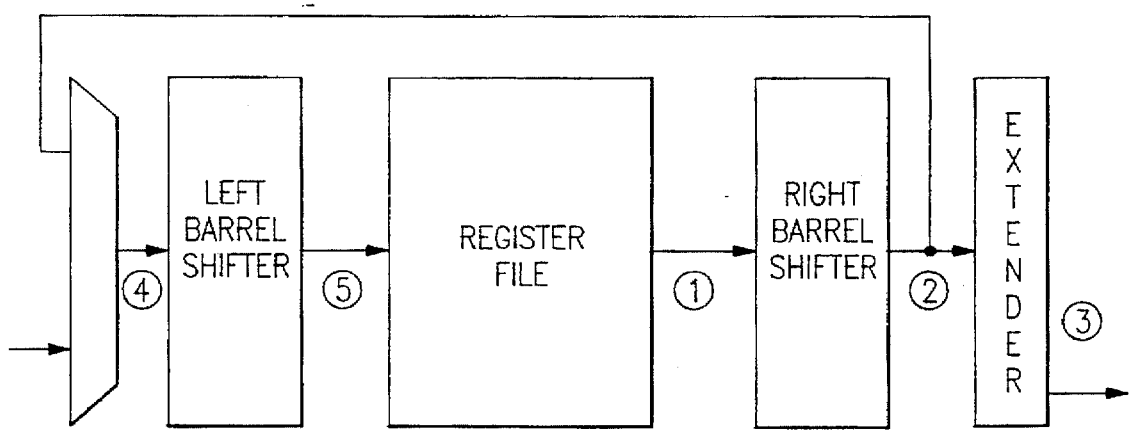
FIG. 4 is a block diagram of data flow in the Register File.

1. Full word read from memory
2. 12 bit rotate right puts partial word into the LSB
3. Extending to full word, then passed to output
4. The inputted partial word is multiplexed into rotated full word from (2)
5. 12 bit rotate left puts full word back to original to be written The above accesses suggest the data flow structure of the memory that is shown in FIG. 4. The numbers in the structure refer to the text above and to FIG. 3.

Figure 5:
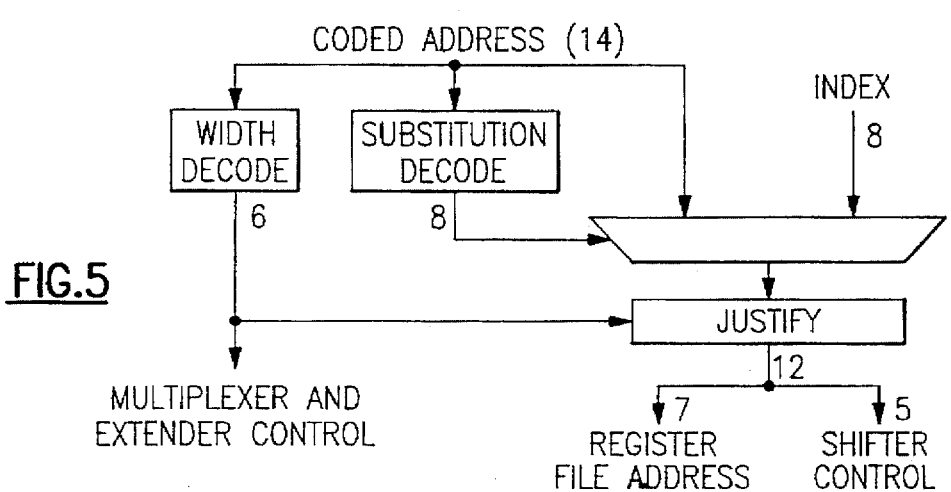
FIG. 5 is a block diagram of Register File address decoding.

The memory address must be decoded to control the above structure. It should be recognized that the MSB of any width of address is at the same significance with reference to the memory. The top six bits of a decoded address are a 32 bit word address, the remainder is a bit address. Therefore, the stage of decoding (in parallel with the substitution) is to decode the address width defining variable field by detecting the position of the most significant termination marker. This allows the address to be MSB justified (shifting in zeros at the LSB). The top six bits can be used directly as a 32 bit word row address the memory. The bottom five bits can be used to directly control both barrel shifters (as seen in FIG. 4), because for example an original 32 bit address will always have a shift of 0b00000 (these having been shifted when the address was MSB justified), similarly a 16 bit address can have a shift of 0bx0000 i.e. 0 or 16 bit shift and a 1 bit address can have a shift of 0bxxxxx i.e. 0 to 31 bit shifts. The extender and input multiplexer are controlled by the access width decode to mask out the output words and multiplex the input words to an appropriate significance respectively. The block diagram of the decode is shown in FIG. 5. It can be seen that the decode of the two variable width fields for width and substitution can be done in parallel and independently.

FIG. 8 represents an example of fixed width word 13 bits long for addressing variable width data and substitution as shown in the bottom two rows. For these examples an eight bit word would have been addressed at location 0b1101ssss, where "ssss" is substituted from another address source.

MICROCODABLE STATE MACHINE STRUCTURE

The substitution into a memory address and variable width accessing of a memory have been brought together in the implementation of a microcodable state machine the structure of which is shown in FIG. 1. The structure is one of a state machine controlling an arithmetic core by way of a wide word of control signals called a microcode instruction. The arithmetic core in turn passes status flags and some data to the state machine.

Figure 2:
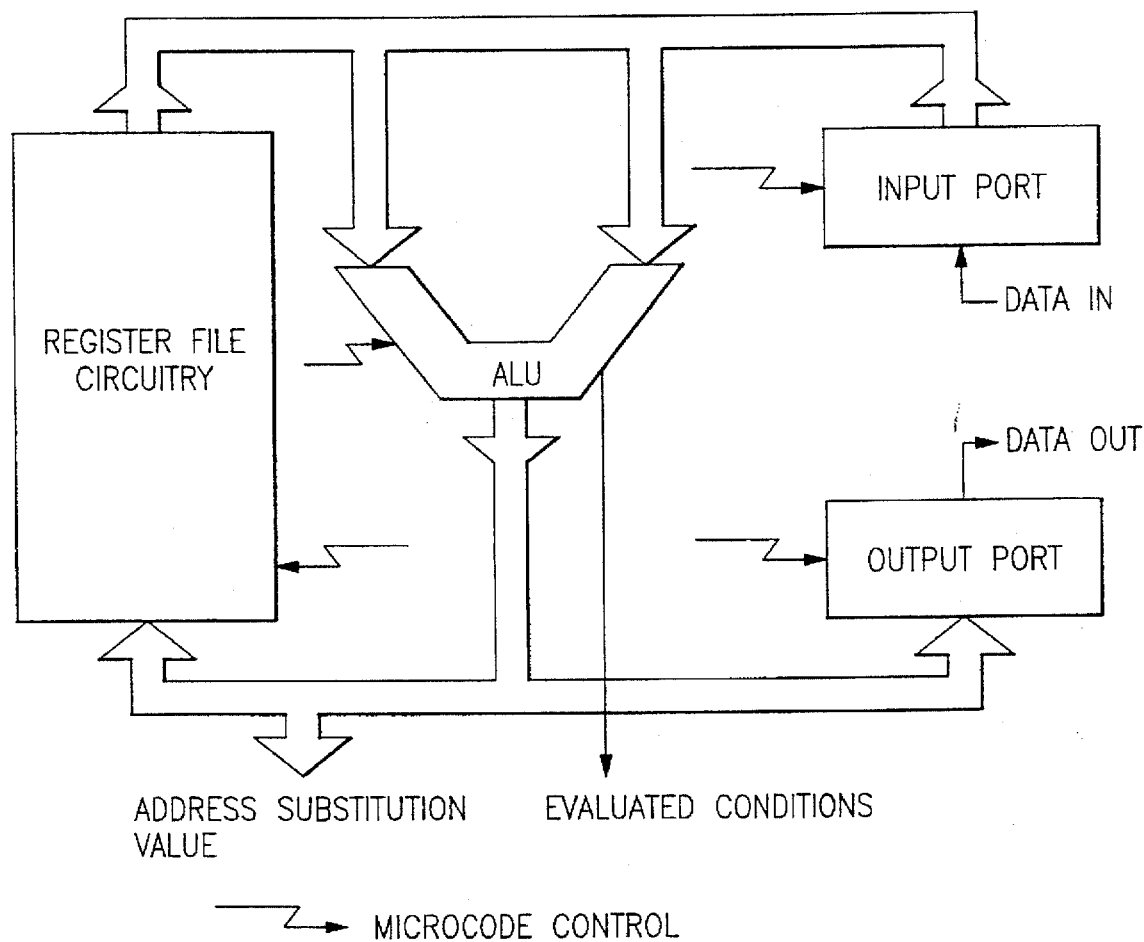
FIG. 2 is a block diagram of the Arithmetic Core.

The state machine consists of a memory containing a list of the microcode instructions. As with conventional microcodable state machines, it is capable of either proceeding through the list of microcode instructions contiguously or any instructions can jump to any other. The jump address is in the form of FIG. 7. The value substituted comes from the arithmetic core as shown in FIGS. 1 and 2. This allows the construction of "jump tables" within the microcode programs. Thus if a jump is made with 3 bits substituted, for example, there are a possible eight contiguous locations that may be jumped to dependent on the value from the arithmetic core, it has so become a programmable jump.

ARITHMETIC CORE

The arithmetic core, as shown in FIG. 2, is composed of a memory called a Register file, an Arithmetic and Logic unit (ALU), an input port and output port. These components are connected by busing and multiplexers. As previously stated, these and the multiplexers defining their connections are entirely controlled by the microcode instruction issued by the state machine. The ALU and ports are conventional, but the Register file is a memory that allows variable width indexed accesses to it. The address to the Register file is coded directly into the microcode instruction.

The advantages of using this method of addressing to the Register file are firstly that many locations in an application do not need to be the full width of the memory (32 bits in this case). Whilst it will cause no effect on the operation of the device to use a full width location it is very wasteful of memory locations. Minimizing the number of memory locations used will minimize the space used by the memory, therefore minimize the capacitive loading in the Register file and so maximize the speed of the Register file. Secondly, the indexing combined with the variable width of memory accessing allows the stepping through of locations of variable width. In the one bit case, this allows an elegant implementation of long division and multiplication.

We claim:

1. A method for using a data dependent address to address a memory, comprising the steps of:

providing a signal representing a fixed width word having a predetermined fixed number of bits to be used for addressing data;

defining the fixed width word with an address field and a substitution field;

defining the address field with a plurality of bits defining the address of the data;

defining the substitution field with a variable width having at least one substitution bit, wherein the substitution field has at least one bit to serve as a termination marker between the address field and the substitution field;

using the substitution field to indicate substituted bits from a separate addressing source; and maintaining the fixed width word for addressing variable width data while inversely varying the width of the address field and the width of the substitution field.

2. The method according to claim 1, further comprising the steps of:

providing an address decoding circuit;

accessing said termination marker is accessible with said address decoding circuit.

3. The method according to claim 1, further comprising the steps of padding the fixed width word with a continuation marker.

4. A method for addressing memory, comprising the steps of:

providing a fixed width word having a predetermined fixed number of bits to be used for addressing data;

defining the fixed width word with an address field and a substitution field;

defining the address field with a plurality of bits defining the address of the data;

defining the substitution field with a variable width having at least one substitution bit;

wherein the substitution field has at least one bit to serve as a termination marker between the address field and the substitution field;

substituting bits in said substitution field, said bits being obtained from a separate addressing source;

maintaining the fixed width word for addressing variable width data while inversely varying the width of the address field and the width of the substitution field; and accessing a memory at an address defined by said address field and said substitution field.

5. The method according to claim 4, wherein said step of substituting bits includes substituting a bit in a position of said termination marker.

6. The method according to claim 4, further comprising the step of padding the fixed width word with a continuation marker.

* * * * *